United States Patent
Maruyama et al.

(10) Patent No.: US 10,346,650 B2
(45) Date of Patent: Jul. 9, 2019

(54) RFID READER-WRITER

(71) Applicant: DENSO WAVE INCORPORATED, Chita-gun, Aichi-pref. (JP)

(72) Inventors: Kentarou Maruyama, Chita-gun (JP); Keita Tsubota, Chita-gun (JP)

(73) Assignee: DENSO WAVE INCORPORATED, Aichi-pref. (JP)

(*) Notice: Subject to any disclaimer, the term of this patent is extended or adjusted under 35 U.S.C. 154(b) by 0 days.

(21) Appl. No.: 15/318,502

(22) PCT Filed: Jun. 12, 2015

(86) PCT No.: PCT/JP2015/067057
§ 371 (c)(1),
(2) Date: Feb. 16, 2017

(87) PCT Pub. No.: WO2015/190607
PCT Pub. Date: Dec. 17, 2015

(65) Prior Publication Data
US 2017/0185813 A1    Jun. 29, 2017

(30) Foreign Application Priority Data

Jun. 13, 2014  (JP) .................. 2014-121998
Jun. 1, 2015   (JP) .................. 2015-111131

(51) Int. Cl.
*G06K 7/10*    (2006.01)
(52) U.S. Cl.
CPC ........... *G06K 7/10316* (2013.01); *G06K 7/10* (2013.01); *G06K 7/10386* (2013.01)

(58) Field of Classification Search
CPC ................................................ G06K 7/10316
(Continued)

(56) References Cited

U.S. PATENT DOCUMENTS

| 6,421,234 B1 | 7/2002 | Ricks et al. |
| 2004/0056760 A1 | 3/2004 | Fukuoka et al. |

(Continued)

FOREIGN PATENT DOCUMENTS

| JP | H09-62769 A | 3/1997 |
| JP | 2010-287054 A | 12/2010 |
| JP | 2013-156754 A | 8/2013 |

OTHER PUBLICATIONS

Aug. 4, 2015 International Search Report issued in International Patent Application No. PCT/JP2015/067057.

*Primary Examiner* — Allyson N Trail
(74) *Attorney, Agent, or Firm* — Oliff PLC

(57) ABSTRACT

An RFID reader-writer includes a housing in which an antenna and a wireless tag processor are housed. The housing includes a front surface, a rear surface facing the front surface, and plural side surfaces connected to the front surface and the rear surface. A reading surface and a front-side gripping surface are formed on the front surface. The antenna is disposed at a position inside the housing which faces the reading surface, such that the antenna can transmit and receive electromagnetic waves via the reading surface. A part of the rear surface which faces the front-side gripping surface is formed as a rear-side gripping surface. The front-side gripping surface and the rear-side gripping surface are configured as a handgrip for gripping the RFID reader-writer with a thumb and a finger.

20 Claims, 12 Drawing Sheets

(58) Field of Classification Search
USPC .............. 235/451, 462.46, 472.02; 713/186
See application file for complete search history.

(56) References Cited

U.S. PATENT DOCUMENTS

| | | |
|---|---|---|
| 2006/0006995 A1 | 1/2006 | Tabankin et al. |
| 2006/0105722 A1* | 5/2006 | Kumar ................. G06F 1/1632 |
| | | 455/90.3 |
| 2007/0017983 A1 | 1/2007 | Frank et al. |
| 2007/0113098 A1* | 5/2007 | Croley ................. G06F 1/1626 |
| | | 713/186 |
| 2010/0127828 A1* | 5/2010 | Connolly ............. G06K 7/0008 |
| | | 340/10.1 |
| 2011/0017828 A1* | 1/2011 | Pine ......................... G06K 7/10 |
| | | 235/472.01 |
| 2011/0188175 A1* | 8/2011 | Palmer .................... H05K 7/00 |
| | | 361/679.01 |
| 2012/0081214 A1* | 4/2012 | Alan .................. G06K 7/10316 |
| | | 340/10.42 |

* cited by examiner

FIG. 2A
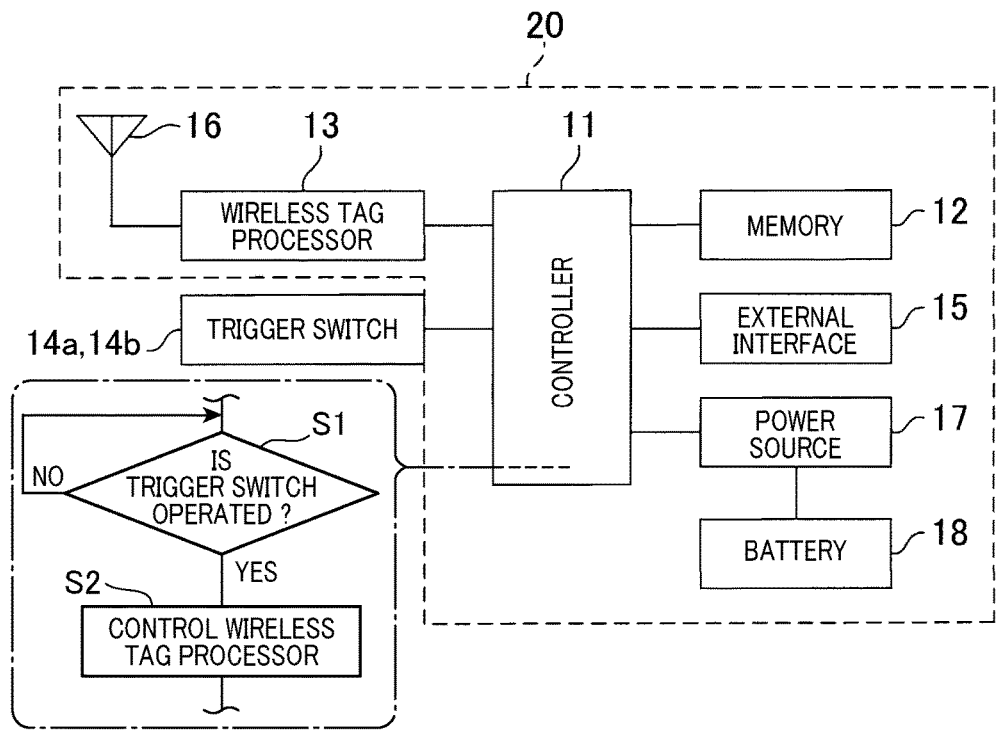
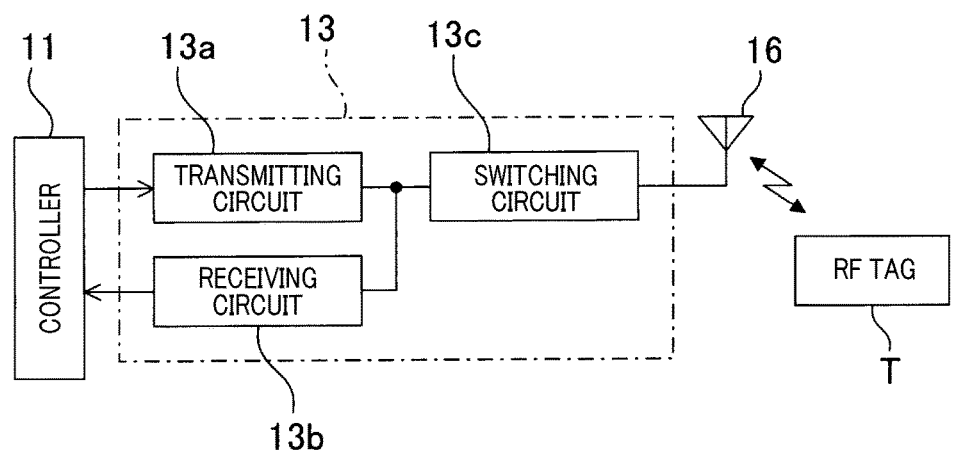
FIG. 2B

RFID READER-WRITER

CROSS-REFERENCE TO RELATED APPLICATION

This application is based on and claims the benefit of priority from earlier Japanese Patent Applications No. 2014-121998 filed on Jun. 13, 2014 and No. 2015-111131 filed on Jun. 1, 2015 the descriptions of which are incorporated herein by reference.

BACKGROUND

Technical Field

The present invention relates to an RFID (Radio Frequency Identification) reader-writer (RFID reading/writing device) which can read data stored in an RF (Radio Frequency) tag without contact and write data to the RF tag without contact.

Related Art

In recent years, an information medium which is equipped with a built-in memory and can write data into the memory without contact and read out data from the memory without contact is widely used in various applications. An RF tag configured to use radio waves (electromagnetic waves) is widely used as such an information medium. Such an RF tag is also referred to as an electronic tag, an IC tag, a wireless tag, or an RFID tag.

An RFID reader is necessary for reading out data from an RF tag, and an RFID writer is necessary for writing data into an RF tag. Although it is not necessary that one device is equipped with both of the above-described readout and write functions, an RFID reader-writer equipped with both of the readout and write functions will be described below.

There are many purposes and various applications of using an RFID reader-writer according to a type of RF tag as a readout target and its usage environment. For instance, an RFID reader-writer is carried to various places where this RFID reader-writer is used, and an RFID reader-writer is placed at a predetermined position so as to be used there. A conventional portable RFID reader-writer needs a case in which a large antenna for reading out information stored in a remote RF tag is provided, and this case is provided with a grip in such a shape that it can be easily grasped. This grip enhances working efficiency of a readout operation and portability of an RFID reader-writer.

Meanwhile, an RFID reader-writer equipped with such a grip cannot be stably placed when being used as a stationary type in some cases, because the grip becomes an obstacle to placing. As a technique of solving this problem, e.g., an RFID reader-writer disclosed in PTL 1 described below is known. This RFID reader-writer is configured such that its main body is connected to its casing via a biaxial hinge, and an antenna unit is provided on one surface of the main body (hereinafter, referred to as the antenna-side surface). Further, a display unit and an input unit are provided on the surface of the main body which faces the antenna-side surface (hereinafter, referred to as the display-side surface). When this RFID reader-writer is used as a stationary type, the main body is housed in the casing with its antenna-side surface oriented upward and the main body functions so as to read out information stored in an RF tag held over this RFID reader-writer. Additionally, when this RFID reader-writer is used as a portable type, the main body is rotated by 180 degrees with respect to the state of being used as a stationary type so as to be housed in the casing with its display-side surface oriented upward. This is so that the main body functions to read out information stored in an RF tag held under this RFID reader-writer.

CITATION LIST

Patent Literature

[PTL 1] Japanese Unexamined Patent Application Publication No. 2010-287054

TECHNICAL PROBLEM

Meanwhile, when the above-described RFID reader-writer capable of being used as both of a portable type and a stationary type is used as a portable type, the display unit and the input unit are positioned on the top surface of the RFID reader-writer and the antenna-side surface is positioned downward. Thus, when the RFID reader-writer is gripped from below in such a manner that the display unit and the input unit are not touched, the antenna-side surface is covered with the hand gripping the RFID reader-writer and this causes a problem that its reading performance is reduced. Additionally, an RFID reader-writer of stationary type is sometimes gripped and used as a portable type. In such a case, since the RFID reader-writer of stationary type is not provided with a part to be gripped such as a handgrip, it is difficult to grip such an RFID reader-writer and its reading performance is reduced if its antenna-side surface is covered with a hand.

SUMMARY

Thus it is desired to provide an RFID reader-writer which can be used as both of a portable type and a stationary type and avoid reduction in reading performance by being formed in such a shape that it can be gripped without covering its antenna-side surface.

In order to accomplish the above-described aim, an RFID reader-writer of exemplary embodiment includes an antenna, a reader, and a housing in which the antenna and the reader are housed. The antenna transmits and receives electromagnetic waves. The reader reads out at least information stored in an RF tag.

The housing includes external surfaces which are exposed outward, and the external surfaces includes a first surface, a second surface facing the first surface, and plural side surfaces connected to the first and second surfaces. A reading surface and one of a pair of gripping surfaces are formed on the first surface. A part of the second surface which faces the one of the pair of the gripping surfaces is formed as the other of the gripping surfaces. The pair of gripping surfaces are formed as a handgrip for gripping the RFID reader-writer with a thumb and a finger.

The antenna is disposed at a position inside the housing which faces the reading surface, in such a manner that the antenna can transmit and receive electromagnetic waves via the reading surface.

ADVANTAGEOUS EFFECTS

In an RFID reader-writer of the exemplary embodiment, external surfaces of a housing in which an antenna and a reader are housed include a first surface, a second surface facing the first surface, and plural side surfaces connected to the first and second surfaces. A reading surface and one of a pair of gripping surfaces are formed on the first surface. An antenna is disposed at a position inside the housing which faces the reading surface, in such a manner that the antenna can transmit and receive electromagnetic waves via the reading surface. A part of the second surface which faces the one of the pair of the gripping surfaces is formed as the other of the pair of the gripping surfaces. Further, the pair of the gripping surfaces are formed as a handgrip for gripping this RFID reader-writer with a thumb and one or plural fingers.

Accordingly, when the RFID reader-writer is used as a portable type, a user can grip the RFID reader-writer by pinching both gripping surfaces between the thumb and one or plural fingers such that the hand gripping the RFID reader-writer does not cover the reading surface, i.e., the antenna. Thus, reduction in reading performance due to the hand gripping the RFID reader-writer can be avoided. Conversely, when the RFID reader-writer is used as a stationary type, the reading surface is oriented upward by placing the RFID reader-writer on an installation site such as a table so that the second surface is oriented downward. In this manner, the RFID reader-writer can be placed in such a manner that the reading surface is stably oriented upward. Since an RFID reader-writer of the exemplary embodiment can be gripped or placed without covering its reading surface as described above, it can be used as both of a portable type and a stationary type and can avoid reduction in reading performance.

For instance, on one of the pair of gripping surfaces, a trigger switch is disposed at a position where a user can operate this trigger switch with the index finger of one hand while gripping the handgrip of the RFID reader-writer with this hand. This trigger switch is operated at the time of causing the reader to start readout processing.

According to the above-described configuration, when a readout work is performed, the handgrip is gripped such that the trigger switch is naturally operated with the index finger. Thus, the RFID reader-writer can be held without covering the reading surface and without making a user conscious of how to hold it in such a way that the reading surface is not covered. As a result, reduction in reading performance due to the hand gripping the RFID reader-writer can reliably be avoided.

In another instance, two trigger switches are disposed on one of the pair of gripping surfaces. Specifically, one of the trigger switches is disposed at a position where a user can operate this trigger switch with the index finger of the right hand while gripping the handgrip with the right hand. The other of the trigger switches is disposed at a position where a user can operate this trigger switch with the index finger of the left hand while gripping the handgrip with the left hand.

The above-described configuration enables a user to naturally operate one of the trigger switches by the index finger of the hand by which the RFID reader-writer is gripped, regardless of whether the user grips its handgrip with the right hand or the left hand. Thus, the RFID reader-writer can be held without covering the reading surface and without making a user conscious of how to hold it in such a way that the reading surface is not covered. As a result, reduction in reading performance due to the hand grasping the RFID reader-writer can surely be avoided.

In still another instance, the first trigger switch and the second trigger switch are disposed on one of the pair of gripping surfaces in the following manner. The first trigger switch is disposed at such a position that a user can operate the first trigger switch with the index finger of the hand by which the handgrip of the RFID reader-writer is gripped. The second trigger switch is disposed at such a position that a user can operate the second trigger switch with the middle finger, the ring finger, and/or the little finger of the hand by which the handgrip is gripped. When the first trigger switch is pressed and the second trigger switch is pressed, a controller of the RFID reader-writer causes the reader to start readout processing.

In order to start readout processing by the reader in the above-described configuration, it is required to press both of the first and second trigger switches. When both of the first and second trigger switches are pressed, both of the pair of the gripping surfaces formed as the handgrip are inevitably or naturally pinched between the thumb and the four fingers including the index finger, the middle finger, the ring finger, and the little finger such that the handgrip is gripped. Accordingly, the handgrip is pinched between the thumb and all of the four fingers so as to be gripped at the time of a readout work. Thus, a user can consciously tightly grip the handgrip further using the middle finger, the ring finger, and the little finger as compared with a case where a user operates the trigger switch by simply using the index finger while gripping the handgrip with the thumb and the index finger. In other words, the user can more tightly grip the handgrip. As a result, it is prevented that the RFID reader-writer slips through the hand and drops due to weak gripping force at the time of a readout work.

Preferably, when one of the first and second trigger switches is pressed, the reader is controlled by the controller so as to be in a standby state wherein the reader can immediately start readout processing according to a pressing operation to the other of the first and second trigger switches. It is also preferable that the reader is controlled by the controller so as to be in a power-saving state wherein power consumption of the reader is reduced than the standby state in a period during which neither the first switch nor the second trigger switch is pressed.

Accordingly, the RFID reader-writer is reduced in power consumption as the power-saving state without making a user conscious of it when being in an unused state wherein none of the first and second trigger switches are pressed. Further, in the standby state, when one of the first and second trigger switches is pressed, readout processing is immediately started in accordance with a pressing operation to the other of the first and second trigger switches. Thus, both of power saving and improvement in readout responsiveness can be achieved.

For instance, a finger-grip structure for the fingers of the hand by which the handgrip is to be gripped is provided on one of the pair of gripping surfaces. In this configuration, the handgrip is gripped by the hand such that one or plural fingers of the hand are placed on the finger-grip structure, and thus, the RFID reader-writer can be held without covering the reading surface and without making a user conscious of how to hold it in the way the reading surface is not covered. As a result, reduction in reading performance due to the hand grasping the RFID reader-writer can surely be avoided.

According to another instance, a step on which the ball of the thumb of the hand gripping the handgrip is provided on the other of the pair of gripping surfaces. In this configuration, the position of the thumb contacting the other of the pair of gripping surfaces is stabilized. Accordingly, this configuration makes it easier for a user to pinch both of the pair of gripping surfaces between the thumb and the fingers, and the user can easily grip the RFID reader-writer.

In still another instance, the first step and the second step are provided on the other of the pair of gripping surfaces. This is so that the ball of the thumb of the right hand is put on the first step in a condition where the handgrip is gripped by the right hand and the ball of the thumb of the left hand is put on the second step in a condition where the handgrip is gripped by the left hand.

According to the above-described configuration, the ball of the thumb of the hand gripping the handgrip is put on one of the first step and the second step, regardless of whether the handgrip is gripped by the right hand or the left hand. Thus, the position of the thumb contacting the other of the pair of gripping surfaces is stabilized, which makes it easier for a user to pinch both of the pair of gripping surfaces between the thumb and the fingers. As the result, the user can easily grip the RFID reader-writer.

BRIEF DESCRIPTION OF DRAWINGS

In the accompanying drawings:

FIG. 2A is a block diagram illustrating overall electric configuration of the RFID reader-writer;

FIG. 2B is a block diagram illustrating detailed configuration of a wireless-tag processing unit in FIG. 2A;

DESCRIPTION OF EMBODIMENTS

First Embodiment

Hereinafter, the RFID reader-writer according to the first embodiment of the present invention will be described with reference to the accompanying drawings.

Figure 1:
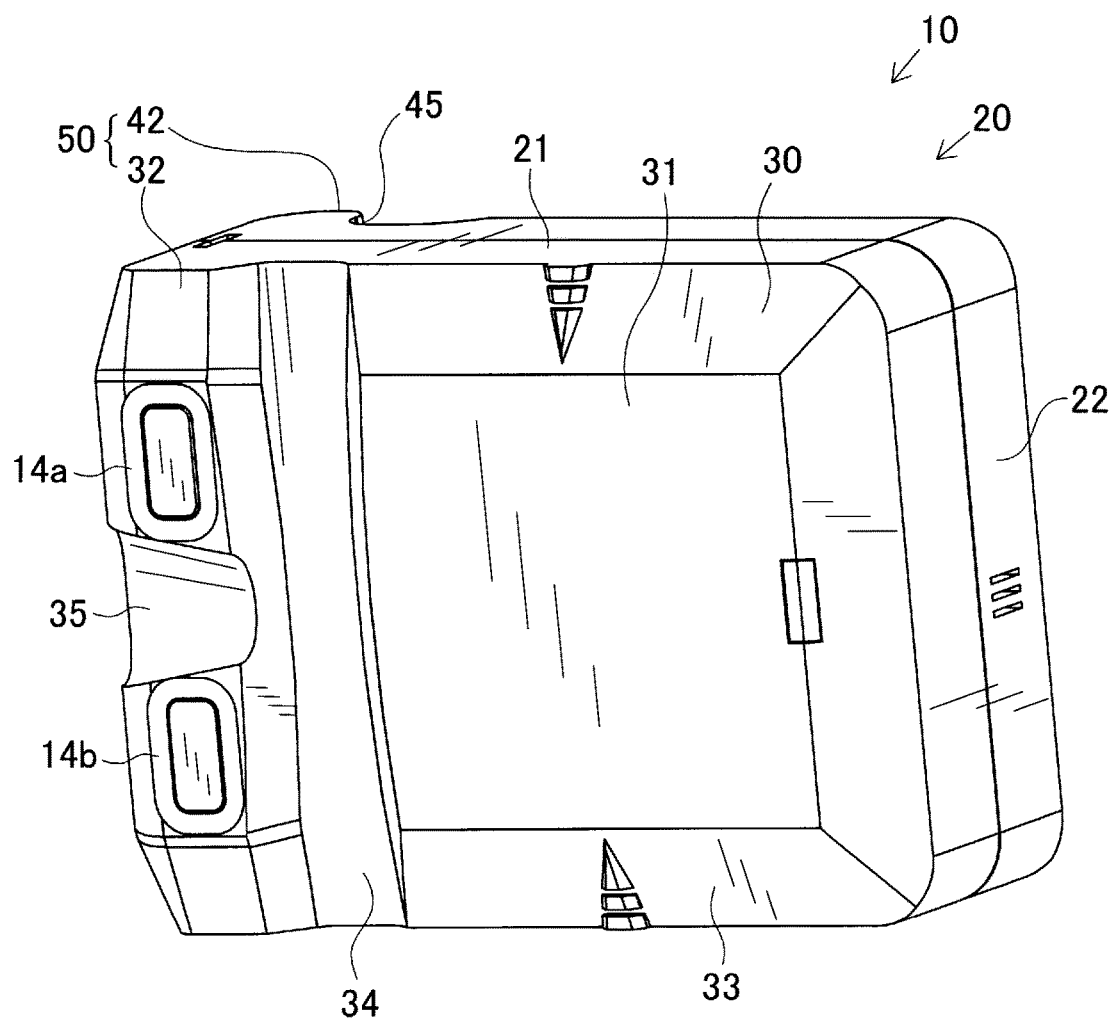
FIG. 1 is a perspective view illustrating the RFID reader-writer of the first embodiment.

FIG. 1 is a perspective view illustrating the RFID reader-writer 10 of the first embodiment. FIG. 2A is a block diagram illustrating overall electric configuration of the RFID reader-writer 10, and FIG. 2B is a block diagram illustrating detailed configuration of the wireless tag processor 13 in FIG. 2A.

The RFID reader-writer 10 of the present embodiment can be used as both of a portable type and a stationary type, and is configured as an information terminal which reads out and writes information from/into an RF tag (also referred to as a wireless tag, an RFID tag, an IC tag, an electronic tag) T.

As shown in FIG. 1, a housing 20 being approximately in the form of a rectangular parallelepiped constitutes the outer shape of the RFID reader-writer 10, and various components including many electronic elements are housed in the housing 20. The shape of the housing 20 will be described below in detail.

As shown in FIG. 2A, a controller 11 configured to control the entirety of the RFID reader-writer 10 is disposed inside the housing 20. The controller 11 is mainly constituted of a microcomputer, functions as an information processor together with a memory 12, and includes components such as a CPU, a system bus, and an input-output interface.

Additionally, the controller 11 is connected to electronic components such as a wireless tag processor 13, two trigger switches 14a and 14b, and an external interface 15. The wireless tag processor 13 is configured as a reading means (or writing means) in the present embodiment. Specifically, the wireless tag processor 13 functions so as to communicate with the RF tag T via electromagnetic waves in cooperation with an antenna 16 and the controller 11, read out data stored in the RF tag T, and write data into the RF tag T. The wireless tag processor 13 is configured as a transceiver circuit using a known electric-wave method, and includes electronic components such as a transmitting circuit 13a, a receiving circuit 13b, and a switching circuit 13c as shown in FIG. 2B.

Although the RFID reader-writer 10 of the present embodiment is configured to perform both of reading out data from the RF tag T and writing data into the RF tag T, it may be configured to perform only readout of data, i.e., it may be configured as an RFID reader. Similarly, the RFID reader-writer 10 may be configured to perform only write of data, i.e., it may be configured as an RFID writer.

The transmitting circuit 13a includes electronic components such as a carrier oscillator, an encoder, an amplifier, a transmission filter, and a modulator, and is configured to output a carrier wave of a predetermined frequency from the carrier oscillator. Additionally, the encoder is connected to the controller 11, encodes transmission data outputted from the controller 11, and outputs the encoded transmission data to the modulator. The modulator receives the carrier wave outputted from the carrier oscillator and the transmission data outputted from the encoder. The modulator generates a modulated signal by performing ASK (Amplitude Shift Keying) modulation on the carrier wave outputted from the carrier oscillator with the use of an encoded transmission code (i.e., modulation signal) outputted from the encoder when transmitting a command to a communication target. The modulator outputs the generated modulated signal to the amplifier. The amplifier amplifies the modulated signal, which is modulated and outputted by the modulator, by a predetermined gain, and outputs the amplified signal to the transmission filter. The transmission filter outputs a transmission signal, which is obtained by filtering the amplified signal inputted from the amplifier, to the antenna 16 via the switching circuit 13c. When the transmission signal is inputted to the antenna 16 in this manner, the transmission signal is radiated as electromagnetic waves from the antenna 16 to the outside.

A radio signal received by the antenna 16 is inputted to the receiving circuit 13b via the switching circuit 13c. The receiving circuit 13b is configured of electronic components such as a reception filter, an amplifier, a demodulator, a binarization circuit, and a decoder. In the receiving circuit 13b, the receive filter filters the signal received via the antenna 16, then the amplifier amplifies the filtered signal, then the demodulator demodulates the amplified signal, then the binarization circuit binarizes the demodulated signal, and then the decoder decodes the binarized signal. The receiving circuit 13b outputs the decoded signal as received data to the controller 11.

Both trigger switches 14a and 14b are disposed so as to be exposed outward from the housing 20 (FIG. 1). When one of the trigger switches 14a and 14b is pressed, readout processing is started by transmitting electromagnetic waves to an readout target such as the RF tag T. Both trigger switches 14a and 14b are configured such that a signal in accordance with the pressing operation is inputted to the controller 11.

The external interface 15 is configured as an interface for performing data communication with an external device such as a server, and performs communication processing in cooperation with the controller 11.

Further, a power source 17 is provided inside the housing 20. The power source 17 is equipped with a known power supply circuit. The power source 17 functions so as to supply electric power to the controller 11 and other electronic components as described above in a condition where the power source 17 is supplied with electric power from the battery 18 or from a commercial power source via a non-illustrated AC (alternating-current) adapter.

Figure 3:
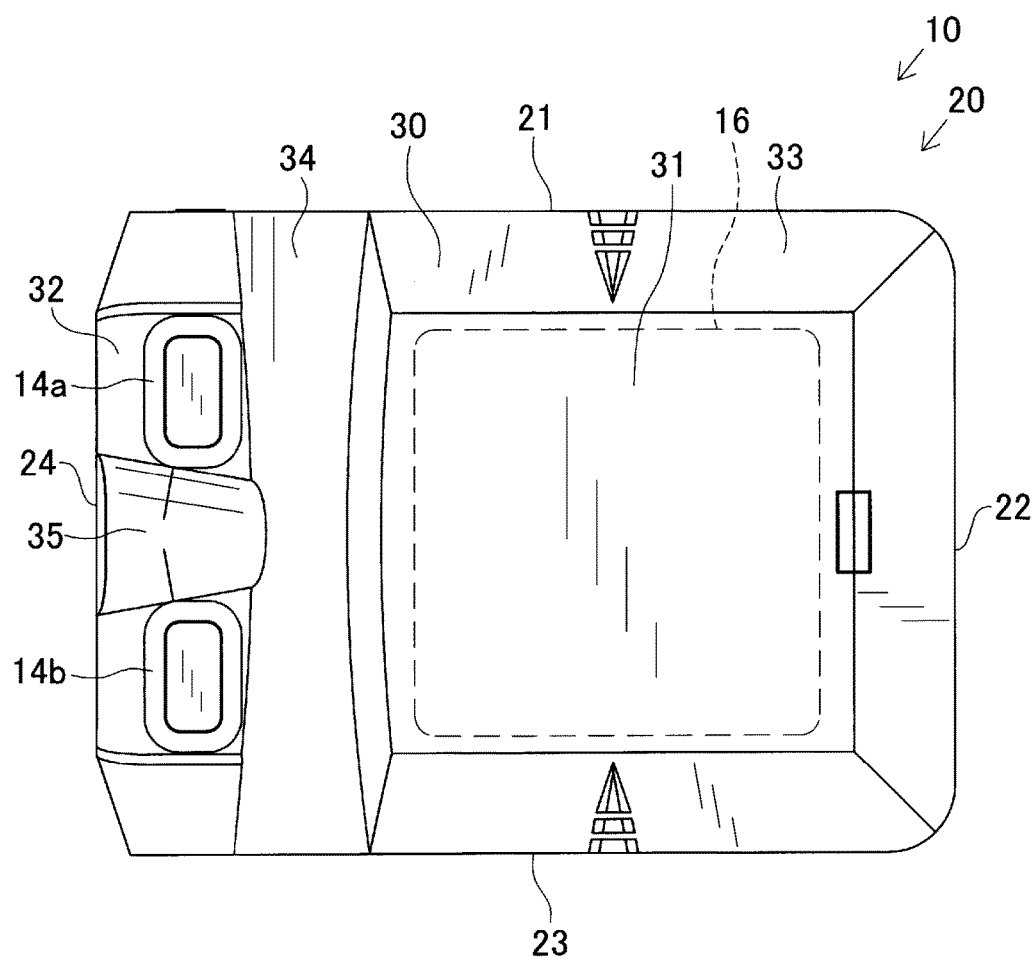
FIG. 3 is a front view of the RFID reader-writer.
Figure 4:
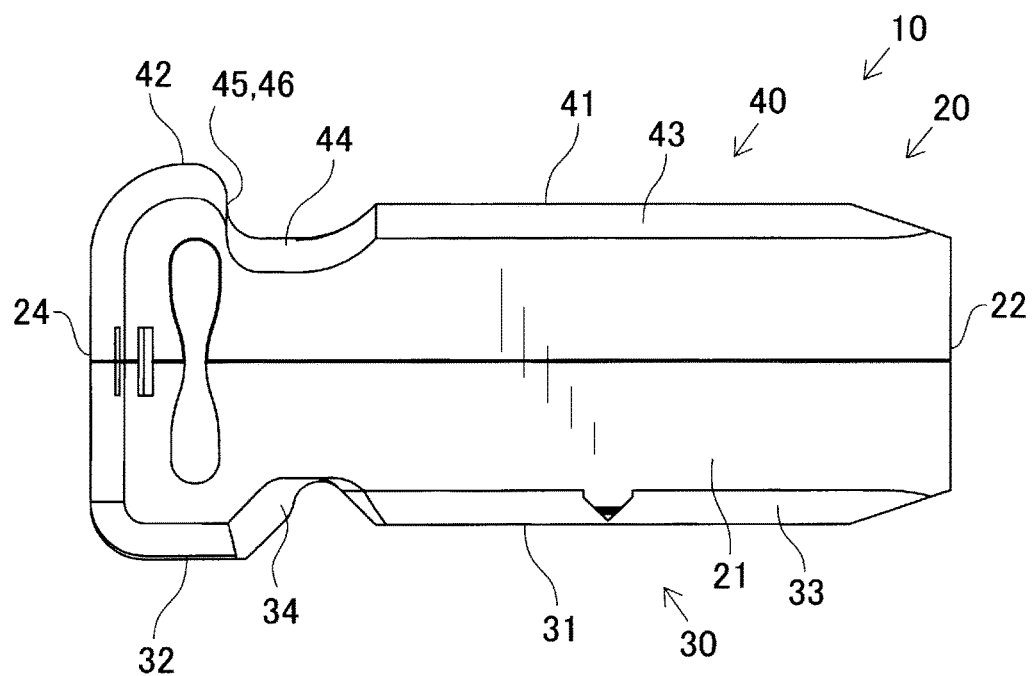
FIG. 4 is a top view of the RFID reader-writer shown in FIG. 3.
Figure 5:
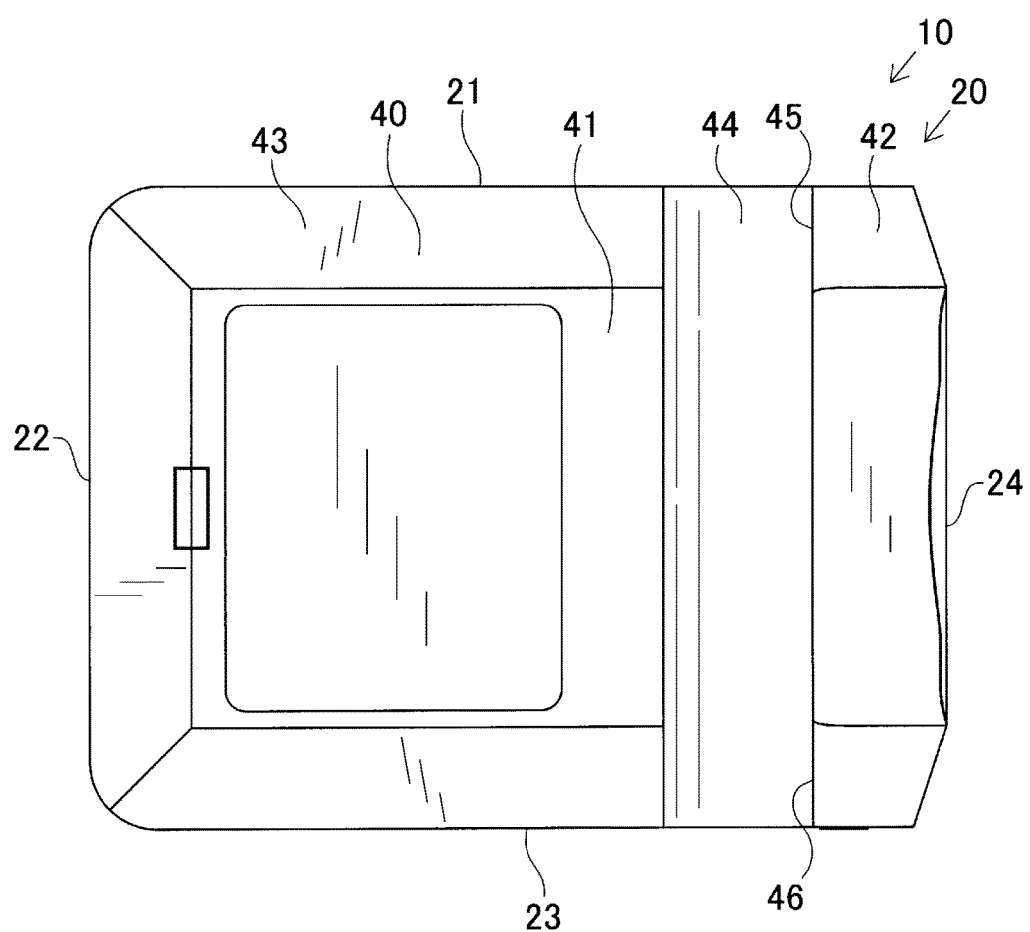
FIG. 5 is a rear view of the RFID reader-writer shown in FIG. 3.
Figure 6:
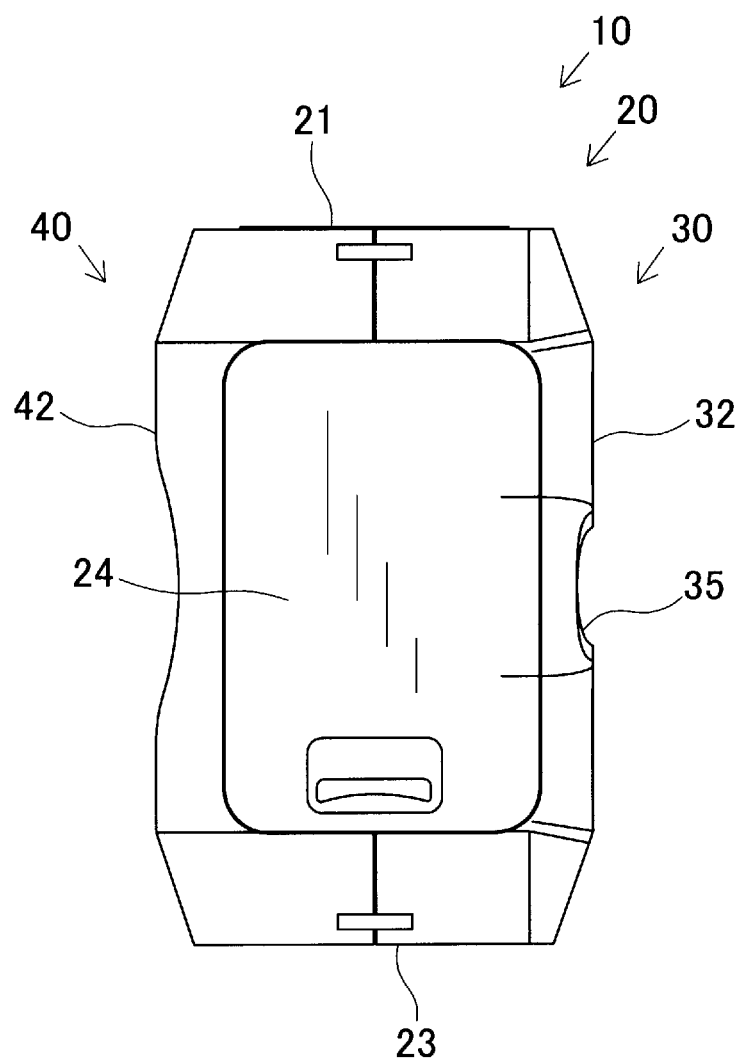
FIG. 6 is a side view of the RFID reader-writer shown in FIG. 3.

Next, detailed shape of the housing 20 will be described with reference to FIG. 3 to FIG. 6. FIG. 3 is a front view of the RFID reader-writer 10. FIG. 4 is a top view of the RFID reader-writer 10 shown in FIG. 3. FIG. 5 is a rear view of the RFID reader-writer shown in FIG. 3. FIG. 6 is a side view of the RFID reader-writer shown in FIG. 3.

The housing 20 is configured of plural case bodies (e.g., two cases consisting of an upper-side case and a lower-side case) which are made of, e.g., resin material. Those plural case bodies are combined with each other such that the outer shape (i.e., wall body) of the housing 20 is approximately in the form of a rectangular parallelepiped (i.e., box) and internal space is formed inside its external surfaces. Thus, the external surfaces of the housing 20 are mainly composed of a front surface 30, a rear surface 40 facing the front surface 30, and plural side surfaces 21, 22, 23, and 24 which are connected to the front surface 30 and the rear surface 40 as shown in FIG. 3 to FIG. 6. Incidentally, the front surface 30 may be an example of the above-described first surface, and the rear surface 40 may be an example of the above-described second surface.

The front surface 30 includes a reading surface 31 and a front-side gripping surface 32. The reading surface 31 is formed so as to be flatly protruded forward from an edge surface 33 connected to the respective side surfaces 21, 22, and 23. The antenna 16 is disposed at a predetermined position inside the housing 20 facing the reading surface 31 such that the antenna 16 transmits and receives electromagnetic waves via the reading surface 31.

The front-side gripping surface 32 is formed so as to be connected to the side surface 24 approximately in parallel with the reading surface 31. A finger-grip groove 34 functioning as a finger-grip structure is formed on the reading surface 31 side of the front-side gripping surface 32 so as to be recessed from the side surface 21 to the side surface 23. A dent 35 is formed on the front-side gripping surface 32 so as to be vertically symmetrical from the side surface 24 to the finger-grip groove 34. Further, the two trigger switches 14a and 14b are vertically symmetrical with respect to the dent 35, and are arranged such that a user can operate the two trigger switches 14a and 14b with the index finger of the hand gripping the handgrip as described below. Incidentally, the front-side gripping surface 32 may be an example of the above-described one of a pair of gripping surfaces.

As shown in FIG. 5, the rear surface 40 includes a placing surface as 41 and a rear-side gripping surface 42. The placing surface 41 is flatly formed so as to be in parallel with the reading surface 31 and be protruded forward from an edge surface 43 which is connected to the respective side surfaces 21 to 23. This is so that the RFID reader-writer can be placed with the placing surface 41 downward when being used as a stationary type.

As shown in FIG. 4, the rear-side gripping surface 42 is a section facing the front-side gripping surface 32, and is formed so as to be connected to the side surface 24 and be roughly in line with the placing surface 41. On the placing surface 41 side of the rear-side gripping surface 42, a thumb-attaching groove 44 is formed at a positon on which the thumb can be hooked when the RFID reader-writer is gripped. The thumb-attaching groove 44 is formed so as to be recessed from the side surface 21 to the side surface 23. Incidentally, the rear-side gripping surface 42 may be an example of the above-described other of the pair of gripping surfaces.

The front-side gripping surface 32 and the rear-side gripping surface 42 formed as described above integrally constitute a handgrip 50 for gripping the RFID reader-writer 10 by pinching the front-side gripping surface 32 and the rear-side gripping surface 42 between the thumb and at least one finger.

Figure 7:
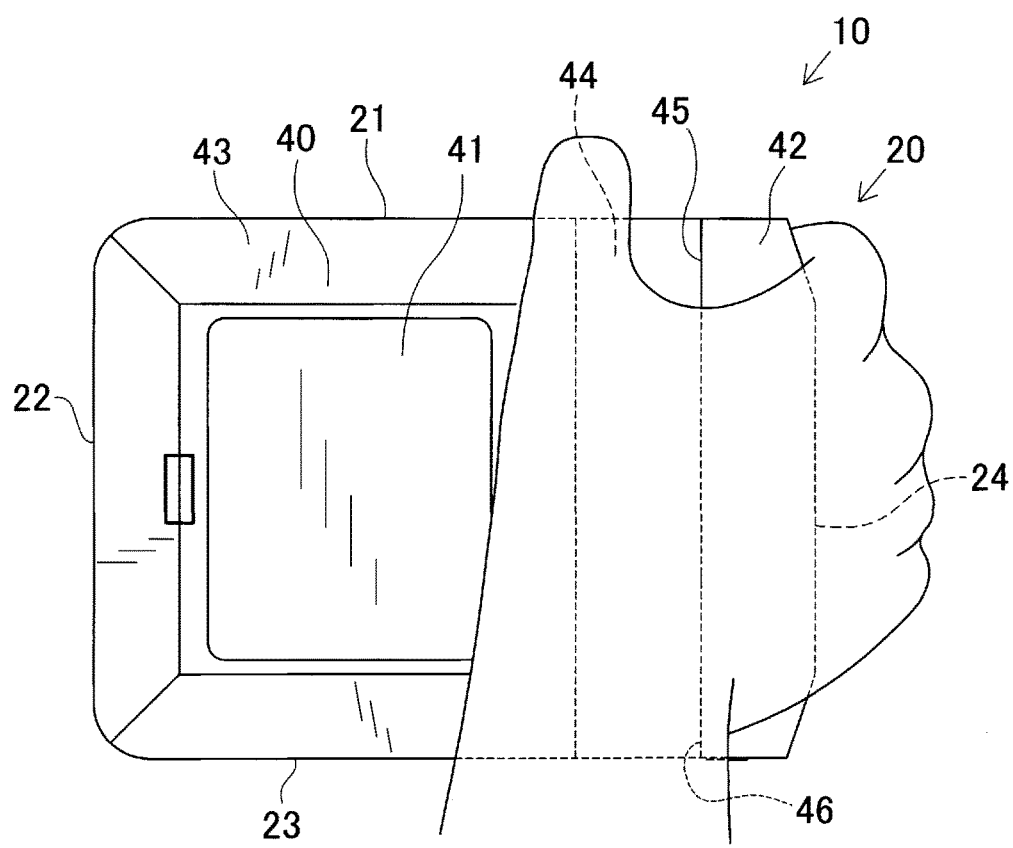
FIG. 7 is a schematic diagram illustrating a condition where the ball of the thumb of the right hand is put on a step of a thumb-attaching groove of a rear-side gripping surface.
Figure 8:
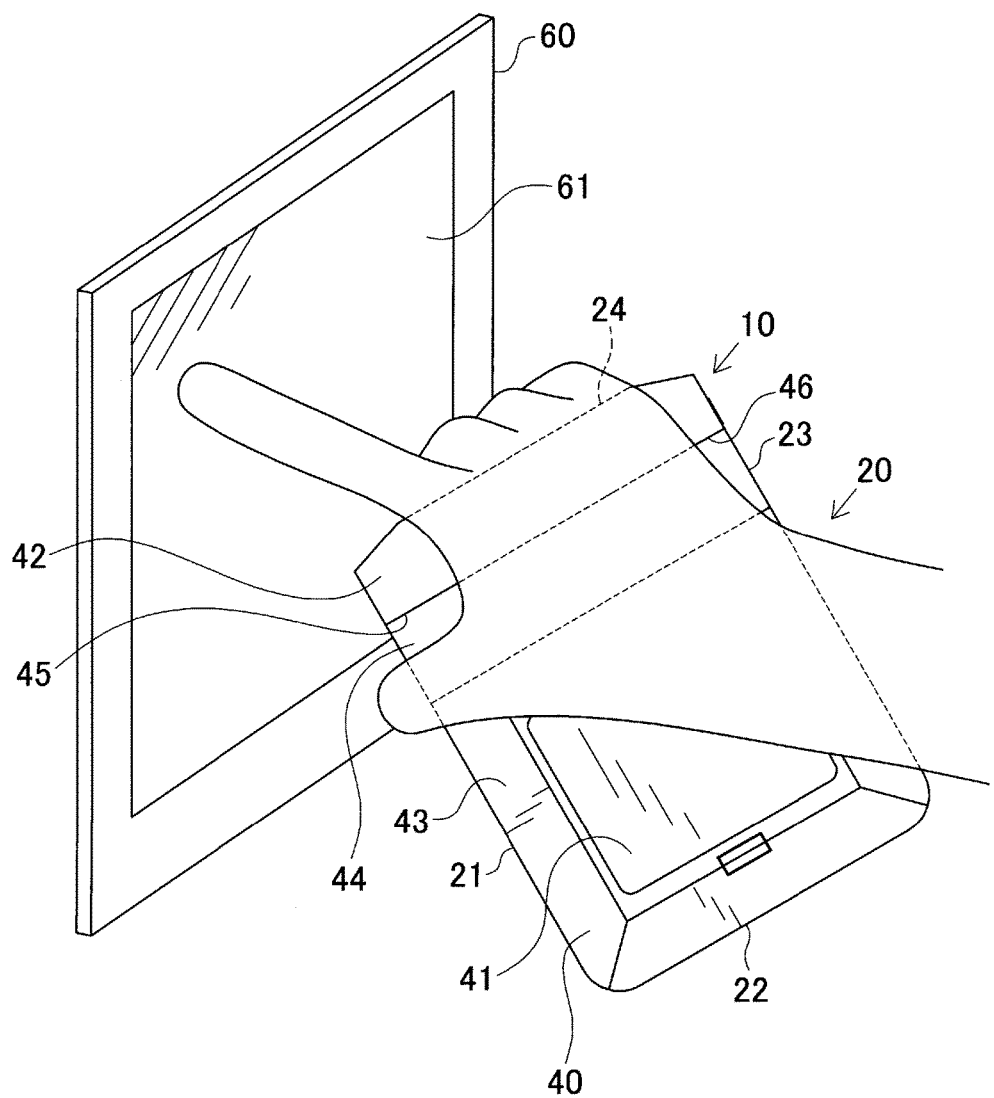
FIG. 8 is a schematic diagram illustrating a condition where a user operates a touch panel with the right hand, while gripping the handgrip of the RFID reader-writer with this right hand.
Figure 9:
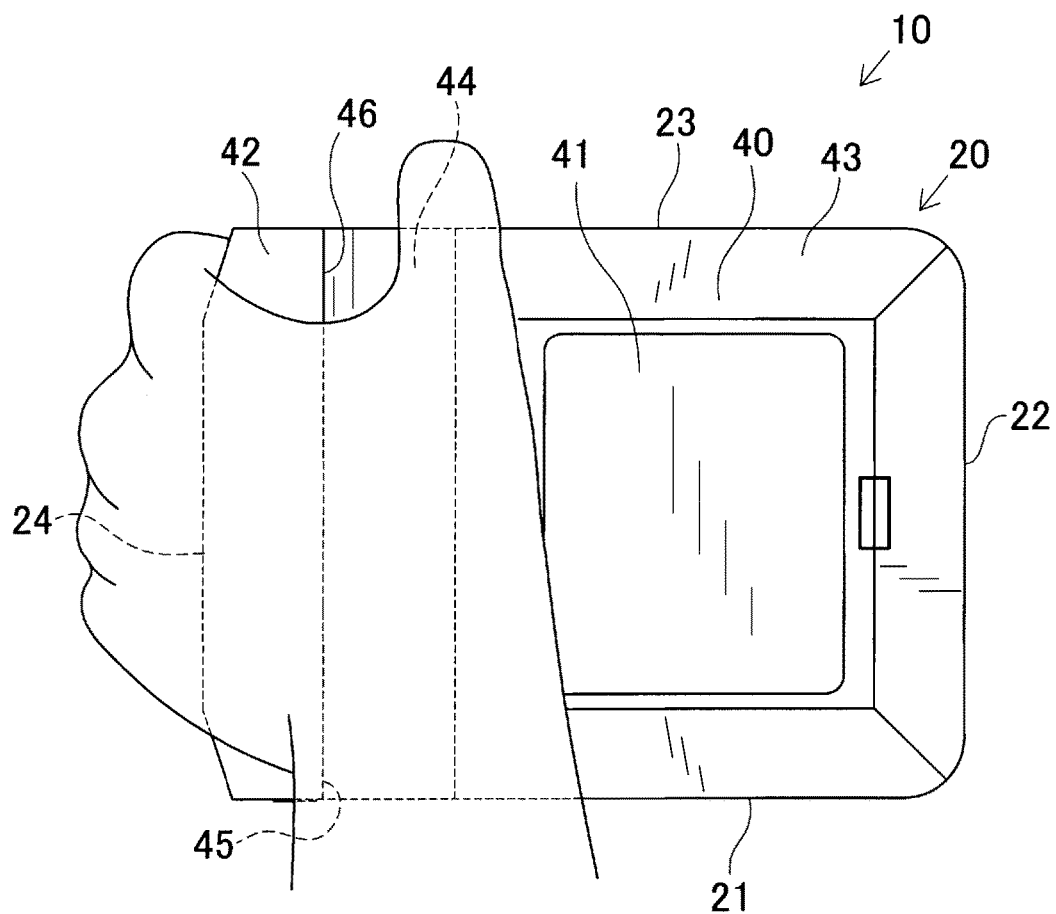
FIG. 9 is a schematic diagram illustrating a condition where the ball of the thumb of the left hand is put on the step of the thumb-attaching groove of the rear-side gripping surface.

Next, with reference to FIG. 7 to FIG. 9, a description will be given of a case where readout work is performed with the use of the RFID reader-writer 10 configured as described above. FIG. 7 is a schematic diagram illustrating a condition where the ball of the thumb of the right hand is put on a step 45 of the thumb-attaching groove 44 of the rear-side gripping surface 42. FIG. 8 is a schematic diagram illustrating a condition where a user operates a touch panel 61 with the right hand while gripping the handgrip 50 of the RFID reader-writer 10 with this right hand. FIG. 9 is a schematic diagram illustrating a condition where the ball of the thumb of the left hand is put on a step 46 of the thumb-attaching groove 44 of the rear-side gripping surface 42.

First, a description will be given of a case where the RFID reader-writer 10 is used as a stationary type.

When the RFID reader-writer 10 is used as a stationary type, the RFID reader-writer 10 is placed on, e.g., a table such that the placing surface 41 of the rear surface 40 is oriented downward. In this manner, the reading surface 31 is positioned at the top surface side, i.e., the RFID reader-writer 10 can be placed such that its antenna side surface is stably oriented upward.

As an instance of using the RFID reader-writer 10 as a stationary type, there is management of load data when goods are loaded on a truck and unladed from the truck. In this case, a side surface or a ceiling surface of a loading platform positioned near an entrance of a truck bed (box) is used as a mounting surface, and the RFID reader-writer 10 is, e.g., detachably mounted on the mounting surface such that the placing surface 41 is directly attached to the mounting surface. When the trigger switch 14a or 14b is pressed in this condition, an irradiation area of electromagnetic waves radiated from the antenna 16 is formed around the entrance of the truck bed (box). In this case, a worker can cause RF tags T attached to respective goods to pass the irradiation area of electromagnetic waves only by loading and unloading those goods on/from the truck bed (box). In this manner, information on loading and unloading of goods is automatically read from and written into each RF tag T. This is only one instance of using the RFID reader-writer 10 as a stationary type, and there are many other methods of using it as a stationary type.

Next, a description will be given of a case where the RFID reader-writer 10 is used as a portable type.

When a user performs readout work by gripping the handgrip 50 with the right hand, the palm of the right hand is attached to the rear-side gripping surface 42 side of the placing surface 41 of the rear surface 40 under a condition where the side surface 21 is oriented upward and the side surface 23 is oriented downward. Then, the thumb of the right hand is put on the side surface 21 side of the thumb-attaching groove 44 of the rear-side gripping surface 42, the index finger of the right hand is positioned near the trigger switch 14*a*, and the other fingers of the right hand excluding the index finger are put on the finger-grip groove 34 of the front-side gripping surface 32. In this condition, as shown in FIG. 7, the ball of the thumb of the right hand is put on the step 45 (i.e., the stepped part constituting the edge part of the side surface 24 side which is the side surface 21 side of the thumb-attaching groove 44 of the rear-side gripping surface 42). Thus, the position of the thumb contacting the rear-side gripping surface 42 is stabilized. Incidentally, the step 45 may be an example of the above-described first step.

The reading surface 31 is oriented toward an RF tag T of a readout target under the condition where the handgrip 50 is gripped such that the front-side gripping surface 32 and the rear-side gripping surface 42 are pinched as described above. Afterward, the trigger switch 14*a* is pressed by the index finger. According to this pressing operation (corresponding to YES in the step S1 of FIG. 2A), the wireless tag processor 13 is controlled by the controller 11 (in the step S2 of FIG. 2A). In this manner, information stored in the RF tag T is read out and information is written into this RF tag T via electromagnetic waves transmitted and received by the antenna 16 through the reading surface 31.

In this condition, the thumb is put on the thumb-attaching groove 44 of the rear-side gripping surface 42 and the index finger is pressing the trigger switch 14*a*, and the other fingers are put on the finger-grip groove 34 of the front-side gripping surface 32. Thus, the right hand gripping the RFID reader-writer 10 does not cover the reading surface 31, and transmission/reception of electromagnetic waves is not interrupted by the right hand.

Additionally, as shown in FIG. 8, a user can operate the tablet 60 while gripping the RFID reader-writer 10, by stretching the index finger to be in contact with the touch panel 61 of the tablet 60. In this condition, since the RFID reader-writer 10 is gripped such that the palm of the right hand is attached to the placing surface 41, any part of the housing 20 does not protrude toward the fingertip, and thus, the housing 20 does not contact the tablet 60 to be operated. In other words, the shape of the handgrip 50 to be gripped as described above prevents the RFID reader-writer 10 in the gripped state from interrupting an operation of the touch panel 61 and/or another device.

Conversely, when a user performs a readout work by gripping the handgrip 50 with the left hand, the palm of the left hand is attached to the rear-side gripping surface 42 side of the placing surface 41 of the rear surface 40 under the condition where the side surface 23 is oriented upward and the side surface 21 is oriented downward. Then, the thumb of the left hand is put on the side surface 23 side of the thumb-attaching groove 44 of the rear-side gripping surface 42, the index finger of the left hand is positioned near the trigger switch 14*b*, and the other fingers of the left hand excluding the index finger are put on the finger-grip groove 34 of the front-side gripping surface 32. In this condition, as shown in FIG. 9, the ball of the thumb of the left hand is put on the step 46 (i.e., the stepped part constituting the edge part of the side surface 24 side which is the side surface 23 side of the thumb-attaching groove 44 of the rear-side gripping surface 42). Thus, the position of the thumb contacting the rear-side gripping surface 42 is stabilized. Incidentally, the step 46 may be an example of the above-described second step.

By orienting the reading surface 31 toward an RF tag T of a readout target under the above-described condition and then pressing the trigger switch 14*a* with the index finger, the RFID reader-writer 10 functions as follows. That is, information stored in the RF tag T is read out and information is written into this RF tag T via electromagnetic waves transmitted and received by the antenna 16 through the reading surface 31.

In this condition, the thumb is put on the thumb-attaching groove 44 of the rear-side gripping surface 42 and the index finger is pressing the trigger switch 14*b*, and the other fingers are put on the finger-grip groove 34 of the front-side gripping surface 32. Thus, the left hand gripping the RFID reader-writer 10 does not cover the reading surface 31, and transmission/reception of electromagnetic waves is not interrupted by the left hand.

Additionally, when a user operates the touch panel 61 of the tablet 60 while gripping the handgrip 50 of the RFID reader-writer 10 with the left hand, any part of the housing 20 does not protrude toward the fingertip. Thus, the shape of the handgrip 50 to be gripped as described above prevents the RFID reader-writer 10 in the gripped state from interrupting an operation of the touch panel 61 and/or another device.

According to the RFID reader-writer 10 of the present embodiment as described above, the wall body of the housing 20 configured to house the antenna 16 and the wireless tag processor 13 is composed of the front surface 30, the rear surface 40 facing the front surface 30, and plural side surfaces 21, 22, 23, and 24 which are connected to the front surface 30 and the rear surface 40. The reading surface 31 and the front-side gripping surface 32 are formed on the front surface 30. The antenna 16 is disposed behind the reading surface 31 such that the antenna 16 can transmit and receive electromagnetic waves via the reading surface 31. On the rear surface 40, a part facing the front-side gripping surface 32 is formed as the rear-side gripping surface 42. The rear-side gripping surface 42 and the front-side gripping surface 32 integrally constitutes the handgrip 50 for pinching the RFID reader-writer 10 between the thumb and at least one finger.

When the RFID reader-writer 10 configured as described above is used as a portable type, a user grips the RFID reader-writer 10 so as to pinch the rear-side gripping surface 42 and the front-side gripping surface 32 between the thumb and at least one finger of one hand. Accordingly, the hand gripping the RFID reader-writer 10 does not cover the antenna 16 (i.e., the reading surface 31 formed on the front surface 30), and thus, reduction in reading performance due to the hand gripping the RFID reader-writer 10 can be avoided. When the RFID reader-writer 10 is used as a stationary type, the RFID reader-writer 10 is placed on an installation site such as a table so that the rear surface 40 is oriented downward. In this manner, the reading surface 31 is positioned at the top surface side, i.e., the RFID reader-writer 10 can be placed such that its antenna side surface is stably oriented upward. Hence, an RFID reader-writer of the present invention can be used as both of a portable type and a stationary type, can be gripped without covering its antenna-side surface by being formed in such a shape, and can avoid reduction in reading performance.

On the front-side gripping surface 32, the trigger switches 14a and 14b are disposed at such positions that a user can operate the trigger switches 14a and 14b with the index finger of the hand by which the handgrip 50 is gripped. Accordingly, when a readout work is performed, the handgrip 50 is gripped such that the trigger switch 14a or 14b is operated by the index finger. Thus, the RFID reader-writer can be held without covering the reading surface 31 and without making a user conscious of how to hold it in the way the reading surface 31 is not covered. As a result, reduction in reading performance due to the hand grasping the RFID reader-writer 10 can be reliably avoided.

In particular, the trigger switches 14a and 14b are disposed on the front-side gripping surface 32 in the following manner. The trigger switched 14a is disposed at such a position that a user can operate the trigger switch 14a with the index finger of the right hand while gripping the handgrip 50 with the right hand. Similarly, the trigger switched 14b is disposed at such a position that a user can operate the trigger switch 14b with the index finger of the left hand while gripping the handgrip 50 with the left hand.

(Modifications)

The above-described configuration enables a user to naturally operate one of the trigger switches 14a and 14b by the index finger of the hand by which the handgrip 50 of the RFID reader-writer 10 is gripped, regardless of whether the user grips the RFID reader-writer 10 with the right hand or the left hand. Thus, the RFID reader-writer 10 can be held without covering the reading surface 31 and without making a user conscious of how to hold it in the way the reading surface 31 is not covered. As a result, reduction in reading performance due to the hand grasping the RFID reader-writer 10 can be reliably avoided. Incidentally, one of the trigger switches 14a and 14b may be omitted depending on its usage environment.

Figure 10:
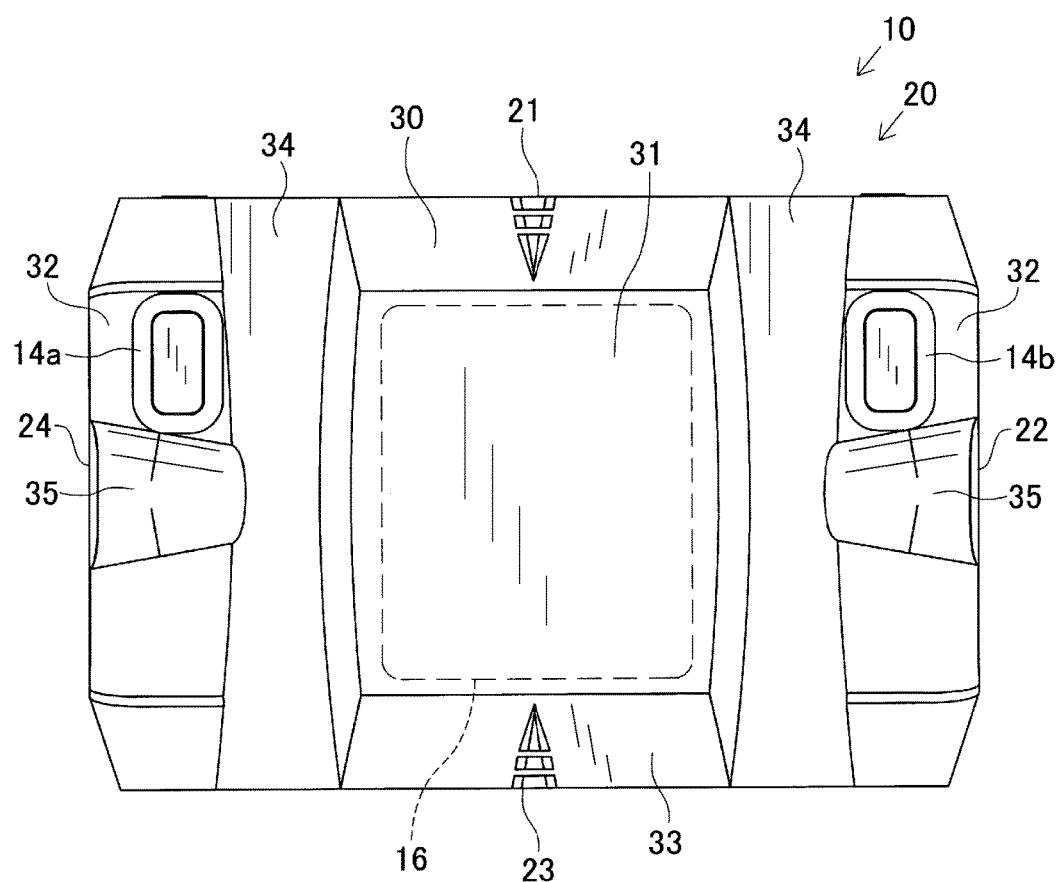
FIG. 10 is a front view of the RFID reader-writer according to a modification of the first embodiment.

FIG. 10 is a front view of the RFID reader-writer 10 according to a modification of the first embodiment.

Additionally, arrangement of the trigger switches 14a and 14b is not limited to the vertically symmetrical arrangement, but may be horizontally symmetrically arranged as shown in FIG. 10. In this case, respective two front-side gripping surfaces 32 are provided on the right and left sides of the front surface 30, respective two rear-side gripping surfaces 42 are provided on the right and left sides of the rear surface 40, respective two finger-grip grooves 34 are formed on the reading surface 31 side of both front-side gripping surfaces 32, and respective two thumb-attaching grooves 44 are formed on the placing surface 41 side of both rear-side gripping surfaces 42. Regardless of whether the handgrip 50 is gripped by the right hand or the left hand in a readout operation in this configuration, the handgrip 50 is gripped such that the trigger switch 14a or 14b is operated by the index finger. Thus, the RFID reader-writer 10 can be held without covering the reading surface 31 and without making a user conscious of how to hold it in a such a way that the reading surface 31 is not covered. As a result, reduction in reading performance due to the hand gripping the RFID reader-writer 10 can be reliably avoided.

Further, the finger-grip groove 34 for the fingers of the hand gripping the handgrip 50 is formed on the front-side gripping surface 32. Accordingly, by gripping the handgrip 50 such that the fingers are put on the finger-grip groove 34, a user can hold the RFID reader-writer 10 without covering the reading surface 31 and without being conscious of how to hold it. Thus, reduction in reading performance due to the hand gripping the RFID reader-writer 10 can be reliably avoided.

Incidentally, the finger-grip structure formed on the front-side gripping surface 32 is not limited to a groove type like the finger-grip groove 34. The above-described effects can be obtained by forming the finger-grip structure in such a pattern that fingers can be easily put on the finger-grip structure except the above-described groove pattern. For instance, the finger-grip structure may be formed like a projection or formed in a wave pattern in accordance with the shape of fingers.

Additionally, the steps 45 and 46 on which the ball of the thumb of the hand gripping the handgrip 50 is to be put are provided on the rear-side gripping surface 42. Since the position of the thumb contacting the rear-side gripping surface 42 is stabilized in this configuration, it makes easier to pinch the rear-side gripping surface 42 and the front-side gripping surface 32 between the thumb and the fingers. As a result, a user can easily and tightly grip the RFID reader-writer 10.

In particular, the step 45 (first step) and the step 46 (second step) are provided on the rear-side gripping surface 42. The ball of the thumb of the right hand is put on the step 45 when the handgrip 50 is gripped by the right hand, and the ball of the thumb of the left hand is put on the step 46 when the handgrip 50 gripped by the left hand.

Regardless of whether the handgrip 50 is gripped by the right hand or the left hand, the ball of the thumb of the hand gripping the handgrip 50 is put on one of the step 45 and the step 46 according to the above-described configuration. Thus, the position of the thumb contacting the rear-side gripping surface 42 is stabilized, which makes easier to pinch the rear-side gripping surface 42 and the front-side gripping surface 32. As a result, a user can easily and tightly grip the RFID reader-writer 10.

Second Embodiment

Figure 11:
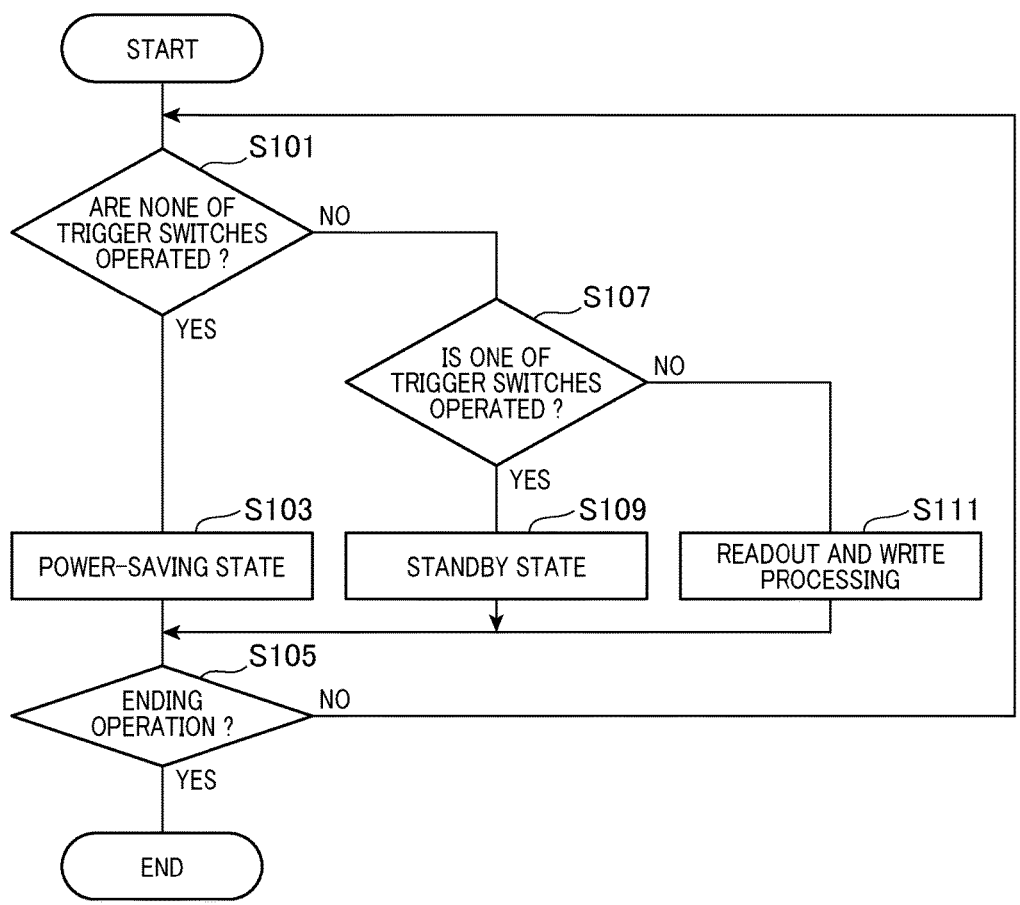
FIG. 11 is a flowchart illustrating a flow of readout-state control processing performed by a controller of the RFID reader-writer of the second embodiment.
Figure 12:
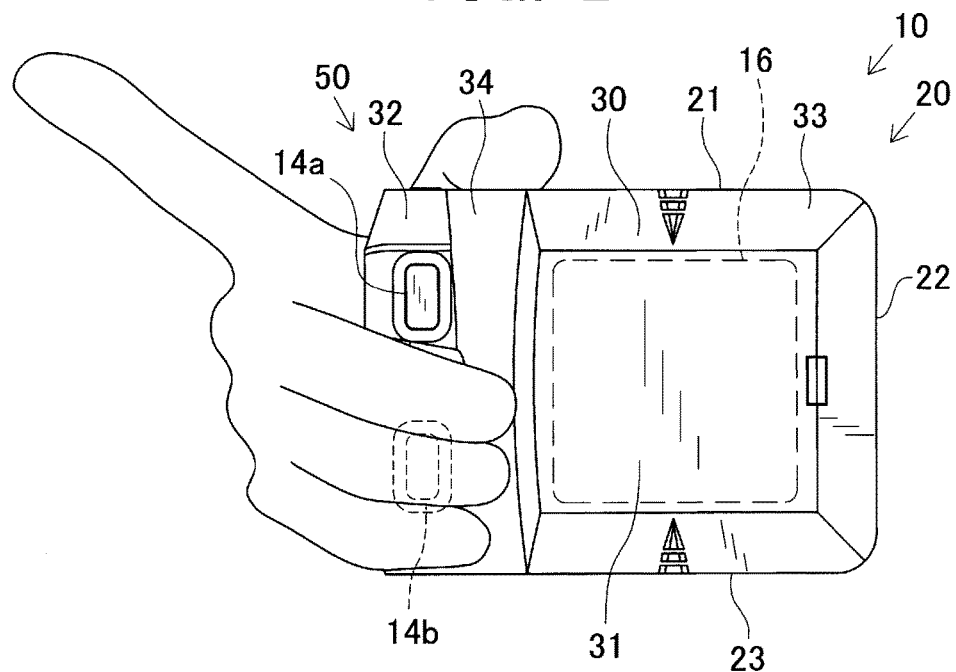
FIG. 12 is a schematic diagram illustrating a condition where another of the two trigger switches is pressed.
Figure 13:
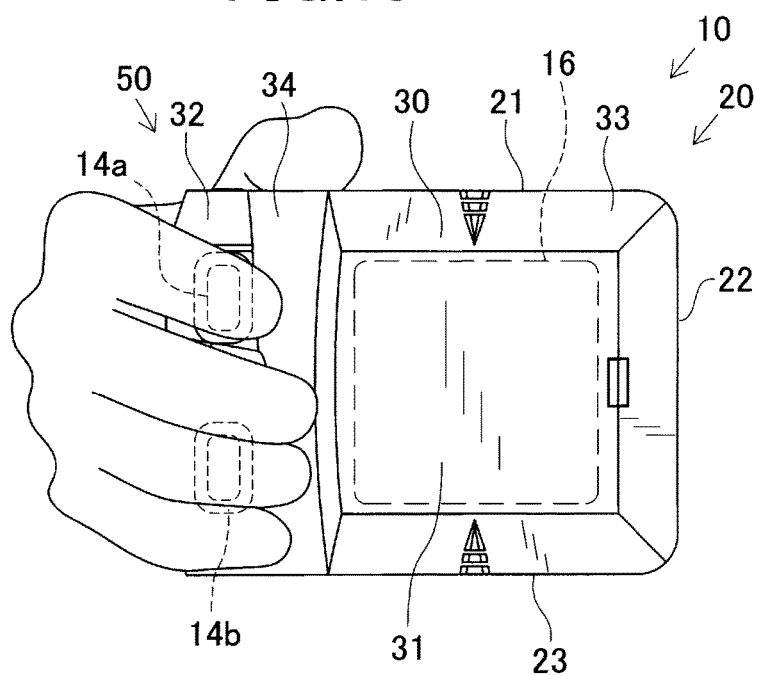
FIG. 13 is a schematic diagram illustrating a condition where both of the trigger switches are pressed.

Next, the RFID reader-writer according to the second embodiment of the present invention will be described with reference to FIG. 11 to FIG. 13. FIG. 11 is a flowchart illustrating a flow of readout-state control processing performed by the controller 11 of the RFID reader-writer of the second embodiment. FIG. 12 is a schematic diagram illustrating a condition where the trigger switch 14b is pressed. FIG. 13 is a schematic diagram illustrating a condition where both trigger switches 14a and 14b are pressed.

The RFID reader-writer 10 of the second embodiment is different from that of the first embodiment in that processing related to readout is controlled according to a pressing operation on two trigger switches. Thus, each component substantially equivalent to the corresponding component in the first embodiment is assigned with the same reference sign as the first embodiment, and duplicate description is omitted.

In the first embodiment, communication between the RFID reader-writer 10 and the RF tag T via electromagnetic waves is started by pressing one of the trigger switches 14a and 14b, and thereby readout processing of reading out data stored in the RF tag T or write processing of writing data into the RF tag T is started. Additionally, the trigger switch 14a is disposed on the front-side gripping surface 32 at such a position that a user can operate the trigger switch 14a with the index finger of the hand gripping the handgrip 50. Further, the trigger switch 14b is disposed on the front-side gripping surface 32 at such a position that a user can operate the trigger switch 14b with the middle finger, the ring finger, or the little finger of the hand gripping the handgrip 50. Since the trigger switch 14a or 14b is operated by the index finger or another finger of the hand gripping the handgrip 50 in this configuration, the force of gripping the handgrip 50 sometimes becomes weak depending on the gripping condition. If this gripping force becomes too weak, there is a possibility that the RFID reader-writer slips through the hand and drops. Incidentally, the trigger switch 14a may be an example of the above-described first trigger switch, and the trigger switch 14b may be an example of the above-described second trigger switch.

Additionally, the wireless tag processor 13 functioning as an RFID module tends to consume a lot of power when the RFID reader-writer 10 is used. Thus, in order to save power consumption of the RFID reader-writer 10, it is desirable to reduce power supply to electronic components such as the wireless tag processor 13 as much as possible. However, if power supply to electronic components such as the wireless tag processor 13 is simply stopped until the trigger switch 14a or 14b is pressed, the response time from pressing the trigger switch 14a or 14b to start of the above readout processing is lengthened. In other words, it causes a problem that readout responsiveness is reduced.

For this reason, the present embodiment attempts to prevent the RFID reader-writer 10 from dropping at the time of a pressing operation and achieve both of power-saving and improvement in readout responsiveness of the RFID reader-writer 10. Specifically, the controller 11 performs the readout-state control processing by using the two trigger switches 14a and 14b disposed on the front-side gripping surface 32 so as to control the readout condition of the wireless tag processor 13. Incidentally, the controller 11 may be an example of the above-described controller.

Hereinafter, the readout-state control processing performed by the controller 11 in the present embodiment will be described with reference to the flowchart of FIG. 11.

When the controller 11 starts the readout-state control processing according to an operation on a non-illustrated switch or the like, first, the determination processing is performed as shown in the step S101. That is, in the step S101, it is determined whether any operation has been performed on at least one of the trigger switches 14a and 14b or not. When only the operation to start the readout-state control processing has been performed and neither the trigger switch 14a nor 14b has been pressed (corresponding to YES in the step S101), the processing proceeds to the step 103. In the step S103, the controller 11 causes respective components to shift to a power-saving state (i.e., a sleep state) or updates the respective components to the power-saving state.

In the power-saving state, the respective components such as the wireless tag processor 13 are caused to be in the state where power supply is stopped in order to save power consumption. In other words, the respective components are caused to be in such a state that the readout processing is not immediately started when the trigger switch 14a or 14b is pressed. Then, until an ending operation is performed, it is determined as No in the step S105 and the processing from the above step S101 is repeated. Thus, until only one of the trigger switches 14a and 14b is pressed, the power-saving state (i.e., sleep state) is maintained.

Next, when only one of the trigger switches 14a and 14b is pressed as preliminary preparation for reading out data stored in an intended RF tag T by a user (corresponding to Yes in the step S107 after No in the step S101), the processing proceeds to the step 109. In the step S109, the controller 11 causes the respective components to shift to a standby state or updates the respective components to the standby state. For instance, by pressing the trigger switch 14b with the middle finger, the ring finger, and/or the little finger of the hand gripping the handgrip 50 under a state where the trigger switch 14a is not pressed as illustrated in FIG. 12, the RFID reader-writer 10 is caused to shift to the standby state. Similarly, the RFID reader-writer 10 is caused to shift to the standby state also by pressing the trigger switch 14a with, e.g., the index finger of the hand gripping the handgrip 50 under a state where the trigger switch 14b is not pressed.

In the standby state, power supply to the respective components such as the wireless tag processor 13 is started and the respective components are caused to be in such a state that the readout processing can be immediately started when the other of the trigger switches 14a and 14b is pressed. Then, it is determined as No in the step S105 until the ending operation is performed so that the processing from the step S101 is repeated. In this manner, the standby state is maintained until the other of the trigger switches 14a and 14b is pressed (i.e., until the trigger switch 14a is pressed in the case of FIG. 12). In the gripping state as shown in FIG. 12, the present embodiment is not limited to an aspect in which the trigger switch 14b is pressed by all of the middle finger, the ring finger, and little finger of the hand gripping the handgrip 50. For instance, the trigger switch 14b may be pressed by one of the middle finger, the ring finger, and the little finger. Additionally or alternatively, the trigger switch 14b may be pressed by two of the middle finger, the ring finger, and the little finger (i.e., it may be pressed by the middle finger and ring finger or it may be pressed by the ring finger and the little finger).

Next, when both trigger switches 14a and 14b are pressed in a state in which the reading surface 31 is oriented to an intended RF tag T (corresponding to No in the step S107 after No in the step S101), the processing proceeds to the step S111. In the step 111, the readout and write processing is started. For instance, the readout and write processing is started by further pressing the trigger switch 14a with the index finger of the hand gripping the handgrip 50, under the state where the trigger switch 14b is pressed by the middle finger, the ring finger and/or the little finger of the hand gripping the handgrip 50. In other words, the readout and write processing is started under the state where the front-side gripping surface 32 and the rear-side gripping surface 42 of the handgrip 50 are gripped by being pinched between the thumb and the four fingers including the index finger, the middle finger, the ring finger, and the little finger as illustrated in FIG. 13. In the readout and write processing, the RFID reader-writer 10 communicates with an RF tag T as a readout target via electromagnetic waves so as to read out data stored in the RF tag T and/or write data into the RF tag T.

Then, when only one of the trigger switches 14a and 14b is released from the pressed state by completing the readout processing in the repeated processing from step S101, the processing proceeds to the step S109 in which the RFID reader-writer 10 is caused to shift to the standby state. Further, when both trigger switches 14a and 14b are released from the pressed state, the processing proceeds to the step S103 in which the RFID reader-writer 10 is caused to shift to the power-saving state.

According to the RFID reader-writer 10 of the second embodiment as described above, the trigger switch 14a is disposed on the front-side gripping surface 32 at such a position that a user can operate the trigger switch 14a with the index finger of the right hand gripping the handgrip 50. Further, the trigger switch 14b is disposed on the front-side gripping surface 32 at such a position that a user can operate the trigger switch 14b with the middle finger, the ring finger, and/or the little finger of the right hand gripping the handgrip 50. In this configuration, when one of the trigger switches 14a and 14b is pressed and then the other of the trigger switches 14a and 14b is pressed, the wireless tag processor 13 starts the readout processing under the control of the controller 11.

In the above configuration, it is required for starting the readout processing to press both of the trigger switches 14a and 14b. In this state, the front-side gripping surface 32 and the rear-side gripping surface 42 of the handgrip 50 are gripped by being pinched between the thumb and all of the four fingers including the index finger, the middle finger, the ring finger, and the little finger. Thus, a user can consciously strongly grip the handgrip 50 further using the middle finger, the ring finger, and the little finger, as compared with a case where the trigger switch is operated by the index finger and the handgrip 50 is gripped by being pinched between the thumb and only the index finger. In other words, the force of gripping the handgrip 50 can be strengthened. As the result, though there is still a possibility that the RFID reader-writer 10 may slip through the hand and drop due to weak gripping force at the time of a readout work, this problem can be avoided as much as possible according to the present embodiment.

In particular, by pressing one of the trigger switches 14a and 14b, the readout-state control processing is performed by the controller 11 such that the RFID reader-writer 10 shifts to the standby state in which the wireless tag processor 13 can immediately start the readout processing in response to a pressing operation on the other of the trigger switches 14a and 14b. Further, under the state where neither the trigger switch 14a nor the trigger switch 14b is pressed, the RFID reader-writer 10 is controlled so as to be in the power-saving state in which power consumption is more reduced than the standby state.

Thus, without making a user conscious of it, the RFID reader-writer 10 can suppress power consumption as the power-saving state when being unused (i.e., when none of the trigger switches 14a and 14b are pressed) and can immediately start the readout processing in response to a pressing operation on the other of the trigger switches 14a and 14b under the standby in which one of the trigger switches 14a and 14b is pressed. Accordingly, both of power saving and improvement in readout responsiveness can be achieved.

In the RFID reader-writer 10 of the second embodiment, the trigger switch 14b is disposed on the front-side gripping surface 32 at such a position that a user can operate the trigger switch 14b with the index finger of the left hand gripping the handgrip 50. Further, the trigger switch 14a is disposed on the front-side gripping surface 32 at such a position that a user can operate the trigger switch 14a with the middle finger, the ring finger, and/or the little finger of the left hand gripping the handgrip 50. Since the handgrip 50 is gripped by being pinched between the thumb and all the four fingers at the time of a readout work even if a user grips the handgrip 50 with the left hand, the user can consciously strongly grip it by further using the middle finger, the ring finger, and the little finger. As the result, the force of gripping the handgrip 50 can be strengthened. In this case, the trigger switch 14b may be an example of the above-described first trigger switch, and the trigger switch 14a may be an example of the above-described second trigger switch.

The present invention is not limited to each of the above-described embodiments and the modification, but can be embodied as follows. For instance, the outer shape of the housing 20 in the above-described embodiments is not limited to a wall body approximately in the form of a rectangular parallelepiped. For instance, a housing of an RFID reader-writer of the present invention may be in the form of a polyhedron whose surfaces are composed of the front surface 30, the rear surface 40, and plural side surfaces connected to those front and rear surfaces 30, 40.

Additionally, the present invention can be applied to an RFID reader-writer which is further equipped with another function such as an optical information-readout function of optically reading out information codes in addition to the above-described readout and write functions.

REFERENCE SIGNS LIST 10 an RFID reader-writer
11 controller (controlling means)
13 wireless tag processor (reading means)
14a,14b trigger switch
16 antenna
20 housing
30 front surface (first surface)
31 reading surface
32 front-side gripping surface (one of a pair of gripping surfaces)
34 finger-grip groove (finger-grip structure)
40 rear surface (second surface)
42 rear-side gripping surface (the other of a pair of the gripping surfaces)
45 step (first step)
46 step (second step)
50 handgrip

What is claimed is:
1. An RFID reader-writer comprising:
an antenna configured to transmit and receive electromagnetic waves;
a reader configured to read out at least information stored in an RF tag via the electromagnetic waves transmitted and received by the antenna;
a housing in which the antenna and the reader are housed, the housing including external surfaces which are exposed outward, the external surfaces including:
a first surface, the first surface providing a front of the RFID reader-writer in a front-rear orientation, the first surface including:
a part formed as a reading surface enabling the electromagnetic waves to be transmitted and received therethrough in the front-rear orientation;
a finger-grip groove; and
one of a pair of grip surfaces, the finger-grip groove being located between the reading surface and the one surface and adjacent to both the reading surface and the one surface, the reading surface and the one surface being positioned side by side to each other in the first surface;
a second surface facing the first surface back to back in the front-rear orientation of the RFID reader-writer, the second surface providing a rear of the RFID reader-writer in the front-rear orientation, the rear including a placing surface, a finger attaching groove, and the other of the pair of grip surfaces, the other surface being faced with the one surface back to back in the front-rear orientation, the finger-attaching groove being located between the placing surface and the other surface and adjacent to both the placing surface and the other surface, the placing surface being provided for stationary use of the RFID reader-writer; and a plurality of side surfaces each being continuous to both the first and second surfaces, wherein the pair of grip surfaces and the one of the side surfaces configure a handgrip used by a user for gripping the RFID reader-writer with a finger of the user, and the antenna is disposed inside the housing so as to be faced with the reading surface, such that the antenna enables transmitting and receiving the electromagnetic waves through the reading surface.

2. The RFID reader-writer according to claim 1, further comprising a finger-grip structure formed on the one of the pair of grip surfaces such that one or plural fingers of a hand of the user gripping the handgrip is allowed to be hooked on the finger-grip structure.

3. The RFID reader-writer according to claim 2, further comprising a step formed on the other of the pair of grip surfaces in such a manner that a ball of a thumb of a hand of the user who grips the handgrip is allowed to be put on the step.

4. The RFID reader-writer according to claim 2, further comprising:
   a first step formed on the other of the pair of grip surfaces in such a manner that a ball of a thumb of a right hand of the user who grips the handgrip is allowed to be put on the first step; and
   a second step formed on the other of the pair of grip surfaces in such a manner that a ball of a thumb of a left hand of the user who grips the handgrip is allowed to be put on the second step.

5. The RFID reader-writer according to claim 1, further comprising a step formed on the other of the pair of grip surfaces such that a ball of a thumb of a hand of the user gripping the handgrip is allowed to be put on the step.

6. The RFID reader-writer according to claim 1, further comprising:
   a first step formed on the other of the pair of grip surfaces in such a manner that a ball of a thumb of a right hand of a user who grips the handgrip is allowed to be put on the first step; and
   a second step formed on the other of the pair of grip surfaces in such a manner that a ball of a thumb of a left hand of the user who grips the handgrip is allowed to be put on the second step.

7. The RFID reader-writer according to claim 1, wherein the thumb-attaching groove is formed as a thumb-attaching groove to which a thumb of the user is allowed to be attached, and
   the pair of grip surfaces and the one of the side surfaces configure the handgrip gripped by the user with the thumb and fingers, other than the thumb, of the user.

8. The RFID reader-writer according to claim 7, further comprising a trigger switch configured to act as a trigger of causing the reader to start readout processing when being operated by a user,
   wherein the trigger switch is positioned at the one of the pair of grip surfaces in such a manner that the trigger switch can be operated by an index finger of a hand of the user gripping the handgrip.

9. The RFID reader-writer according to claim 8, further comprising a finger-grip structure formed on the one of the pair of grip surfaces in such a manner that one or plural fingers of a hand of the user gripping the handgrip is allowed to be hooked on the finger-grip structure.

10. The RFID reader-writer according to claim 9, further comprising a step formed on the other of the pair of grip surfaces such that a ball of a thumb of a hand of the user gripping the handgrip is allowed to be put on the step.

11. The RFID reader-writer according to claim 10, further comprising:
    a first step formed on the other of the pair of grip surfaces in such a manner that a ball of a thumb of a right hand of the user who grips the handgrip is allowed to be put on the first step; and
    a second step formed on the other of the pair of grip surfaces in such a manner that a ball of a thumb of a left hand of the user who grips the handgrip is allowed to be put on the second step.

12. The RFID reader-writer according to claim 7, further comprising at least two trigger switches configured to act as triggers of causing the reader to start readout processing when being operated by a user,
    wherein one of the at least two trigger switches is disposed at such a position that the user can operate the one of the at least two trigger switches with an index finger of a right hand of the user while gripping the handgrip with the right hand; and
    another of the at least two trigger switches is disposed at such a position that the user can operate the one of the at least two trigger switches with an index finger of a left hand of the user while gripping the handgrip with the left hand.

13. The RFID reader-writer according to claim 12, further comprising a finger-grip structure formed on the one of the pair of grip surfaces in such a manner that one or plural fingers of a hand of the user gripping the handgrip is allowed to be hooked on the finger-grip structure.

14. The RFID reader-writer according to claim 13, further comprising a step formed on the other of the pair of grip surfaces in such a manner that a ball of a thumb of a hand of the user who grips the handgrip is allowed to be put on the step.

15. The RFID reader-writer according to claim 13, further comprising:
    a first step formed on the other of the pair of grip surfaces in such a manner that a ball of a thumb of a right hand of the user who grips the handgrip is allowed to be put on the first step; and
    a second step formed on the other of the pair of grip surfaces in such a manner that a ball of a thumb of a left hand of the user who grips the handgrip is allowed to be put on the second step.

16. The RFID reader-writer according to claim 7, further comprising:
    a first trigger switch and a second trigger switch which are configured to act as triggers of causing the reader to start readout processing when being operated by a user; and
    a controller configured to control the reader according to a pressing operation on the first trigger switch and the second trigger switch,
    wherein
    the first trigger switch is disposed on the one of the pair of grip surfaces at such a position that the user can operate the first trigger switch with an index finger of a hand by which the handgrip is gripped;

the second trigger switch is disposed on the other of the pair of grip surfaces at such a position that the user can operate the second trigger switch with at least one of a middle finger, a ring finger, and a little finger of the hand by which the handgrip is gripped; and the controller is configured to cause the reader to start readout processing when the first trigger switch is pressed and the second trigger switch is pressed.

17. The RFID reader-writer according to claim 16, wherein the controller comprises
- standby control means for causing the reader to become in a standby state in response to a pressing operation on one of the first trigger switch and the second trigger switch, the standby state being a state in which the reader can immediately start the readout processing in response to a pressing operation on another of the first trigger switch and the second trigger switch, and
- power control means for causing the reader to become in a power-saving state in which power consumption of the reader is more reduced than the standby state, when neither the first trigger switch nor the second trigger switch is pressed.

18. The RFID reader-writer according to claim 16, further comprising a finger-grip structure formed on the one of the pair of grip surfaces in such a manner that one or plural fingers of a hand of the user who grips the handgrip is allowed to be hooked on the finger-grip structure.

19. The RFID reader-writer according to claim 18, further comprising a step formed on the other of the pair of grip surfaces in such a manner that a ball of a thumb of a hand of the user who grips the handgrip is allowed to be put on the step.

20. The RFID reader-writer according to claim 18, further comprising:
- a first step formed on the other of the pair of grip surfaces in such a manner that a ball of a thumb of a right hand of the user who grips the handgrip is allowed to be put on the first step; and
- a second step formed on the other of the pair of grip surfaces in such a manner that a ball of a thumb of a left hand of the use who grips the handgrip is allowed to be put on the second step.

* * * * *